INVENTORS
JOHN A. McLAUGHLIN,
& RUDOLF A. VAN ECK
BY Bosworth, Sessions,
Herrstrom & Cain
ATTORNEYS

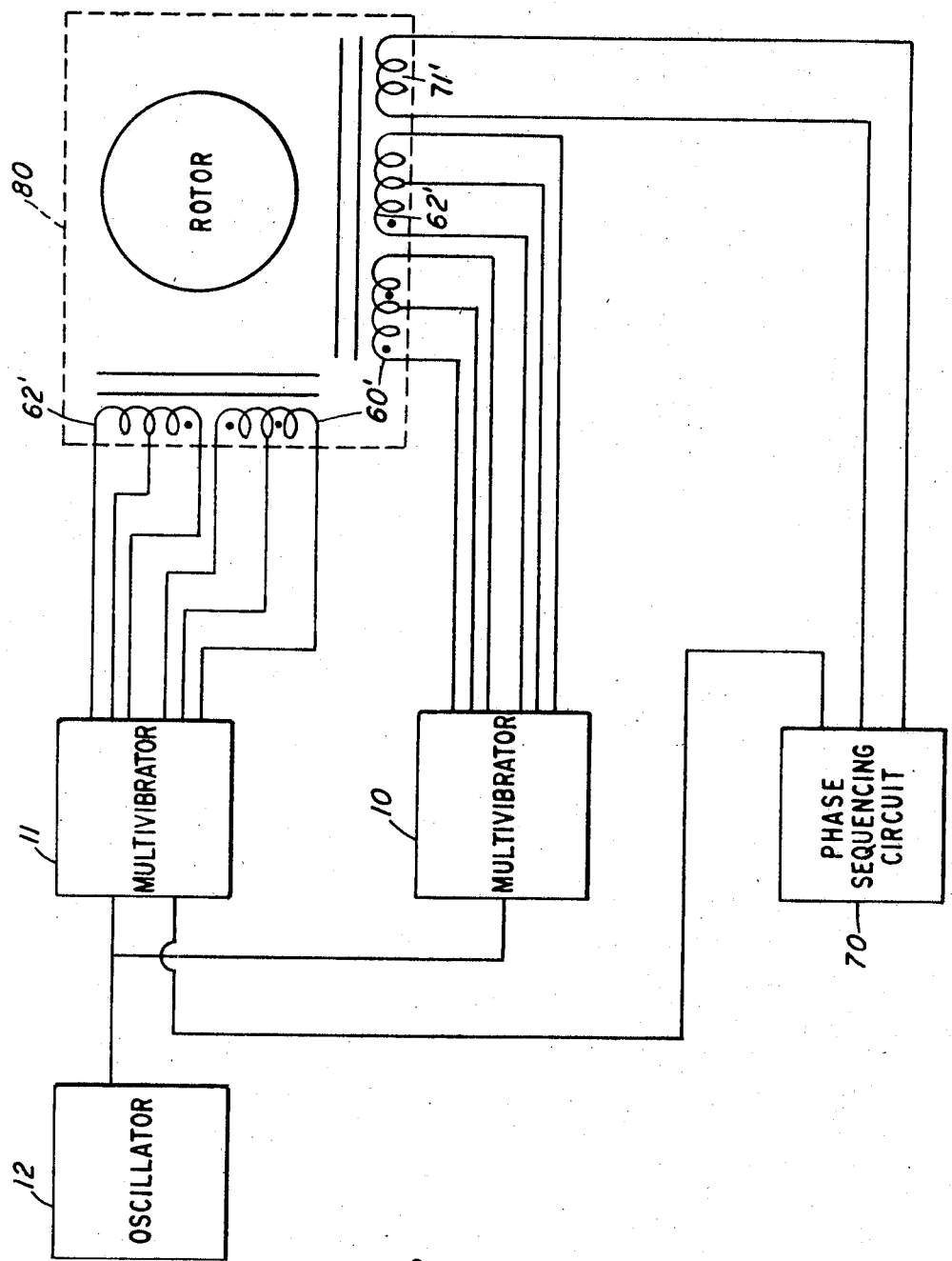

United States Patent Office 3,515,967
Patented June 2, 1970

3,515,967
TWO-PHASE POWER SUPPLY AND MOTOR
John A. McLaughlin, St. Clair Shores, Mich., and Rudolf A. van Eck, Palos Verdes Estates, Calif., assignors to Lear Siegler, Inc., Santa Monica, Calif., a corporation of Delaware
Filed Dec. 27, 1967, Ser. No. 693,940
Int. Cl. H02k 27/00
U.S. Cl. 318—138     8 Claims

ABSTRACT OF THE DISCLOSURE

A static inverter and particularly a static inverter for providing two alternating current output voltages related in phase by 90° from a source of unidirectional voltage and including circuit improvements for accurately maintaining the desired displacement between the two output phases and for controlling their time sequence.

BACKGROUND OF THE INVENTION

Figure 1:
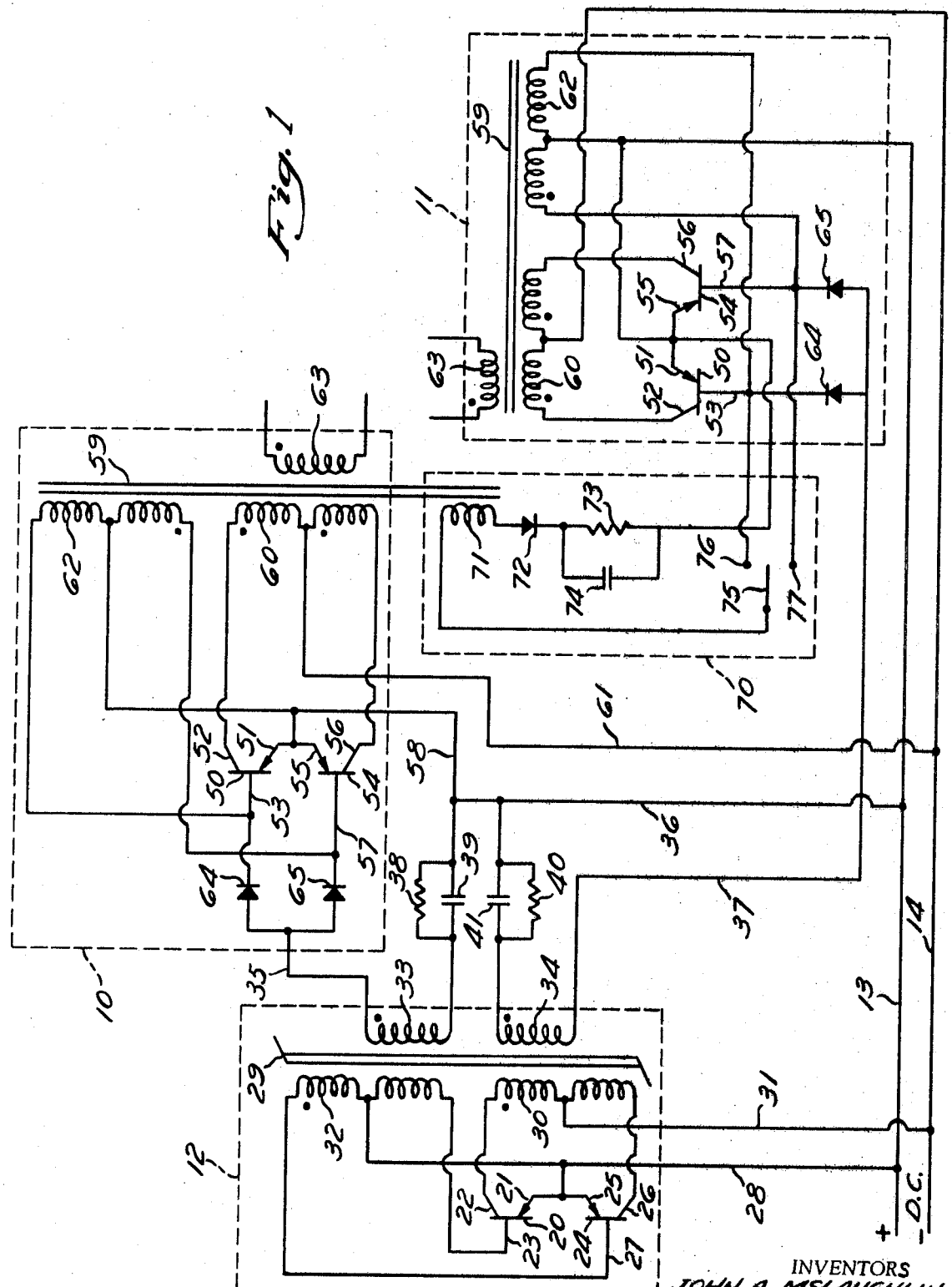

Two-phase static inverters broadly are old and well known. One measure of a two-phase inverter is its ability to maintain a fixed phase displacement, commonly 90°, between its two output phases. An object of this invention is to provide improved circuitry for maintaining a desired phase displacement between the two output phases of a two-phase static inverter, and, in particular, to maintain a 90° displacement therebetween. Another object is to provide such circuitry that is simple, employs only static components, employs fewer and/or less expensive components than known circuits for accomplishing similar results and is particularly suitable for and effective in accomplishing the results desired from it. A particular object of this invention is to provide a two-phase static inverter especially suitable for driving a two-phase alternating current motor. Yet another object is to provide a two-phase static inverter including circuitry for insuring a preselected phase sequence of operation of the two output phases of the inverter.

SUMMARY OF THE INVENTION

This invention comprehends a two-phase static inverter which includes a pair of static power converters substantially identical in design and operation. Each multivibrator provides one output phase. Each of the power converters provides alternately positive and negative generally square wave pulses from a unidirectional quantity in response to successive trigger signals supplied to it and is referred to in the following description as a bistable multivibrator or a multivibrator. The means for triggering the alternations in the output of each of the multivibrators and for interlocking the alternating current output voltages of the two multivibrators in a fixed 90° phase relationship consists of a saturable magnetic reference oscillator. Both multivibrators are connected to a source of direct current power.

The alternating outputs of the multivibrators and the phase displacement between them are controlled and maintained by means of a saturable magnetic oscillator designed to operate at twice the desired output frequency of the multivibrators. The oscillator may be a known device, such as a Royer saturable magnetic oscillator, which provides a square wave output. The square wave output of the reference oscillator is differentiated by circuit elements to provide alternating positive and negative voltage spikes spaced apart in time by 90° of the output frequency of each of the multivibrators. Thus, all the positive voltage spikes are spaced apart 180° of each output phase. The negative voltage spikes are similarly spaced from each other and are also phase displaced from the positive voltage spikes by 90° of each phase of the output voltage of the two-phase static inverter. The positive voltage spikes or triggering signals are applied, as will be described more fully below, only to the inputs of the switches comprising one of the bistable multivibrators and the negative voltage spikes or triggering signals are applied only to the input of the other bistable multivibrator. These signals trigger each multivibrator from one of its stable states to the other and so on and positively interlock their alternating voltage outputs in a desired phase. The elements comprising the embodiment described and shown here and their cooperation are described in detail below.

DETAILED DESCRIPTION OF THE DRAWINGS

FIG. 1 is a circuit diagram of an embodiment of this invention; and

FIGS. 2A, 2B, 2C, and 2D are diagrams of operating voltages appearing at various points in the inverter circuit shown in FIG. 1.

FIG. 3 is a combined block and schematic diagram of the two-phase inverter of FIG. 1 connected to a two-phase induction motor.

DETAILED DESCRIPTION OF THE INVENTION

Reference oscillator

Reference oscillator 12, shown in FIG. 1, is of a general type known as a saturable magnetic oscillator. The oscillator comprises PNP transistor 20 having an emitter 21, a collector 22 and a base electrode 23; and PNP transistor 24 having an emitter 25, a collector 26, and a base electrode 27. The emitters 21 and 25 are connected together and to positive D.C. bus 13 by conductor 28. The two transistors 20 and 24 are employed as switching devices and are so associated with each other and with a source of unidirectional voltage so as to be able to invert it to an alternating quantity. The two transistors are arranged to be rendered alternately conductive and nonconductive for controlling the application of the unidirectional quantity to a suitable load device.

Reference oscillator 12 also includes a saturable magnetic core 29 having a substantially rectangular hysteresis loop characteristic and provided with a center-tapped winding 30 connected at its one end to collector 22 of transistor 20 and at its opposite end to collector 26 of transistor 24. The center tap of winding 30 is connected by conductor 31 to negative D.C. bus 14. A center-tapped feedback winding 32 is also provided on core 29 and is connected at one end to base 27 of transistor 24 and at its other end to base 23 of transistor 20. The center tap of winding 32 is connected to emitters 21 and 25 of the two transistors and to positive D.C. bus 13 by conductor 28. In addition, core 29 is provided with two output windings 33 and 34. The relative voltages appearing across windings 30, 32, 33, and 34 on core 29 at a given time are indicated in FIG. 1 by the dot symbol convention.

When D.C. power is applied to the oscillator described above, one or the other of the two transistors 20 and 24 moves toward a saturated condition, permitting current to flow through its emitter-collector circuit and interconnected winding 30 on core 29. Assuming core 29 is in an unsaturated condition, the current flow through winding 30 will drive it toward saturation and induce voltages in the other windings 32, 33, and 34 linking core 29. Winding 32 is arranged so that the induced voltages appearing between its opposite ends and its center tap comprise a signal applied to the base electrode of the conducting transistor tending to drive it further into saturation while the other transistor has applied to its base a signal holding it in a "cut-off" or non-conducting condition. Voltages are also induced in output windings 33 and 34. This condition pertains until core 29 is saturated; at which time, the output voltages induced in windings 32, 33, and 34 fall to zero, removing the base driving current from the conducting transistor and turning it off. Then, current flow in the collector circuit of the previously conducting transistor and through winding 30 stops.

When current flow stops in winding 30, the flux in core 29 naturally falls a small amount, inducing voltages of opposite polarity to that which previously existed in all transformer windings. The previously conducting transistor is driven further into cut-off by the positive potential on its base from its feedback winding. The other transistor is driven to conduction by the negative potential on its base from its feedback winding, permitting a current to flow in its collector circuit that produces a flux in core 29, driving it toward an opposite condition of saturation. During this time, the transistor formerly conducting is maintained at cut-off while the other transistor is conducting. Once saturation of the core in the opposite direction is reached, the previously conducting and now cut-off transistor is again rendered conducting and the other transistor is switched from conduction to cut-off. The cycle thus described continues to repeat itself, producing an alternating voltage in the winding 30 having a square wave form represented by the curve shown in FIG. 2C.

Windings 33 and 34 on core 29 of reference oscillator 12 comprise output windings associated with the two main output phases A and B of the inverter, respectively, as will be described more fully below. It should be noted that the "dot" end of winding 33 is connected by conductor 35 to the input of phase A bistable multivibrator 10 and that the opposite end of winding 33 is connected to positive D.C. bus 13. Output winding 34 on core 29 is oppositely connected from winding 33 in that the "dot" end of the winding 34 is connected by conductor 36 to the positive D.C. bus 13 while the opposite end of the winding is connected by conductor 37 to the input of phase B bistable multivibrator 11.

Figure 2:
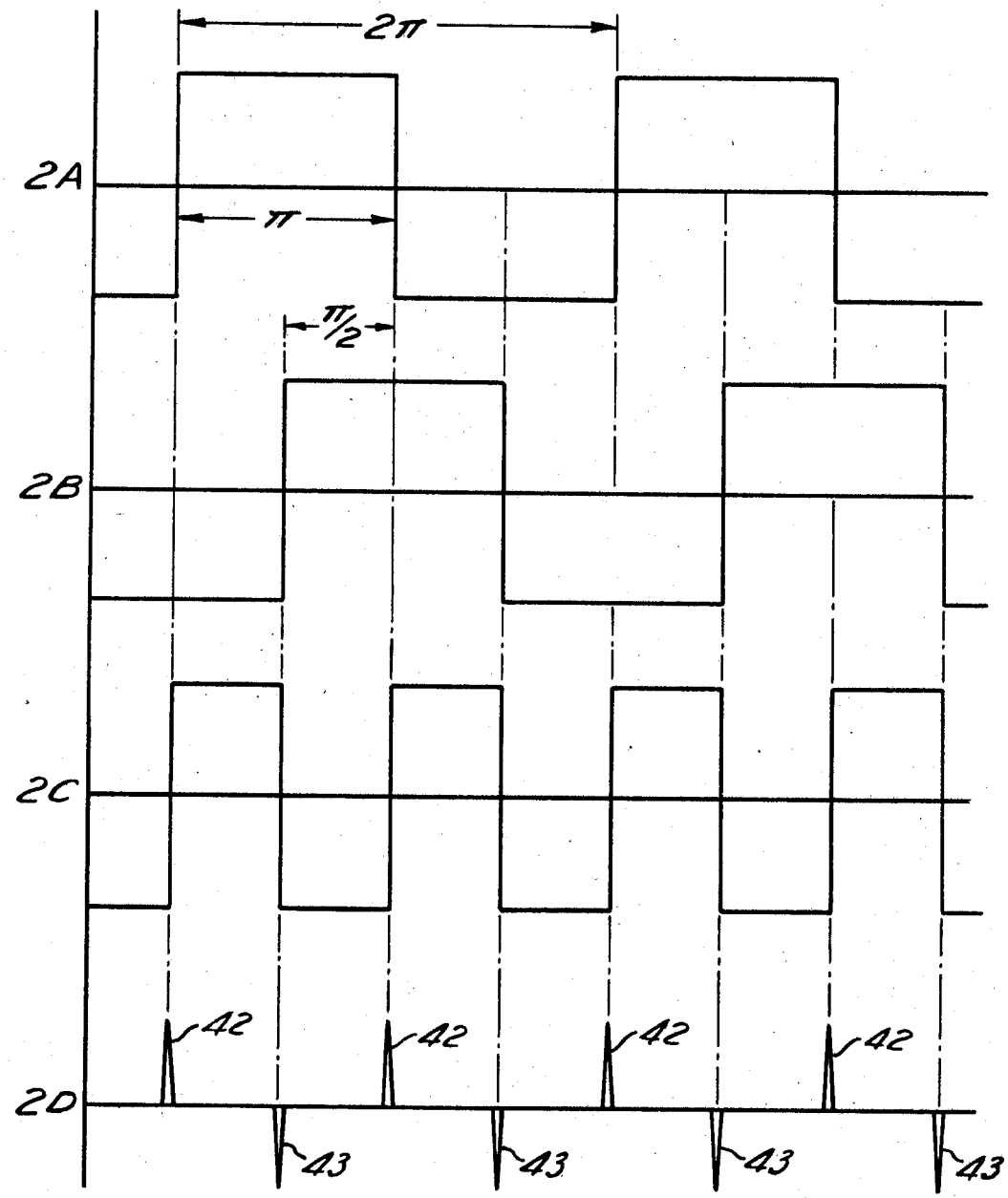

Connected to the output windings 33 and 34 of reference oscillator 12 are circuit means for differentiating the square wave output pulses and transforming them thereby into positive and negative voltage spikes. The differentiating circuit associated with output winding 33 comprises the parallel combination of resistor 38 and capacitor 39 connected through conductor 36 between one end of the winding and positive D.C. bus 13. The differentiating circuit associated with output winding 34 comprises the parallel combination of resistor 40 and capacitor 41 connected through conductor 36 between the "dot" end of the winding and positive D.C. bus 13. The voltage peaks shown in FIG. 2D represent the voltage spikes formed by the differentiating circuits from the output voltages of each of the windings 33 and 34. In FIG. 2D, the positive spikes 42 correspond to the positive going side of the square wave output of reference oscillator 12 as shown in FIG. 2C, and the negative spikes 43 correspond to the negative going side of the same square wave output.

Bistable multivibrators

The phase A and phase B output elements of the two-phase static inverter consist of identical static power converter elements or bistable multivibrators. Thus, in FIG. 1 of the drawings, corresponding parts of each element have been identified by the same reference numerals and the following description applies equally to both elements.

Each bistable multivibrator comprises a PNP transistor 50 having an emitter 51, collector 52, and base electrode 53 and a PNP transistor 54 having an emitter 55, collector 56, and base electrode 57. The emitters 51 and 55 are connected together and to positive D.C. but 13 by conductors 58 and 36. The two transistors are arranged to be alternately rendered conductive and non-conductive for controlling the application of the unidirectional quantity to a suitable load device. The two transistors 50 and 54 are employed as switching devices and are so associated with each other and the source of unidirectional voltage so as to be able to invert it into an alternating quantity.

The two transistor switches 50 and 54 of each bistable multivibrator are magnetically coupled by a core 59 of magnetic material linked with windings 60, 62, and 63. Core 59 is preferably of conventional construction exhibiting conventional hysteresis loop characteristics. Center-tapped winding 60 has one end connected to collector 52 of transistor 50 and its opposite end to collector 56 of transistor 54. The center tap of winding 60 is connected by conductor 61 to negative D.C. bus 14. Center-tapped winding 62 has one end connected to base electrode 53 of transistor 50 and its other end to base electrode 57 of transistor 54. The center tap of winding 62 is connected to emitters 51 and 55 of the two transistors and to positive D.C. bus 13 by conductor 58. In addition, core 59 is linked by output winding 63. The relative voltages appearing across the windings at a given time are indicated by the dot symbol convention.

Both distable multivibrators 10 and 11 have the base electrodes 53 and 57 of their switching pair of PNP transistors 50 and 54 connected through diodes 64 and 65, respectively, to one of the output windings of reference oscillator 12. As shown in FIG. 1, the base electrodes of the two transistors of phase A bistable multivibrator 10 are connected by conductor 35 to the "dot" end of the output winding 33 of reference oscillator 12. The base electrodes of phase B bistable multivibrator 11 are connected by means of conductor 37 to the end opposite the "dot" end of reference oscillator output winding 34.

When D.C. power is applied to the bistable multivibrator circuits described above, one or the other of the two transistors 50 and 54 moves toward a saturated condition, permitting current to flow through its emitter-collector circuit including half of winding 60. Current flow through winding 60 induces voltages in the other windings 62 and 63 linking core 59. Winding 62 is so arranged that the induced voltage appearing between its opposite ends and its center tap tends to drive the conducting transistor further into saturation and to hold the other transistor in a "cut-off" or non-conducting condition. The voltage induced in winding 63 is, of course, is the phase A output voltage.

The bistable multivibrator remains in this stable condition with one transistor switch "on" and the other transistor switch "off" until triggered by a voltage spike provided by reference oscillator 12 and the associated differentiating circuit and applied to the base electrodes of the two switching transistors. Considering the phase A bistable multivibrator 10, for example, assume transistor switch 50 is conducting and transistor switch 54 is turned off. When a voltage spike appears in conductor 35 and is of a polarity that will be passed by diodes 64 and 65, the voltage spike is applied to both base electrodes 53 and 57 of the two transistor switches in the phase A multivibrator. The incoming voltage spike will turn off transistor switch 50, stopping the flow of current in its collector circuit including one-half of winding 60. As the current in winding 60 falls to zero, a voltage is induced in winding 62 which provides a base drive signal tending to turn on transistor 54 and hold transistor 50 in its non-conducting condition. The next voltage spike passed by diodes 64 and 65 in the transistor switch base inputs will switch the multivibrator to its opposite stable state.

OPERATION

Phase A multivibrator 10 is triggered from one state to another by voltage spikes derived from voltages induced in output winding 33 of the reference oscillator and appearing in conductor 35. Phase B multivibrator 11 is triggered in accordance with voltage spikes derived from voltages induced in output winding 34 of the reference oscillator 12 and supplied by conductor 37. It will be apparent from the foregoing and from the previous description of the reference oscillator that only one polarity of the alternately positive and negative voltage spikes appearing in conductors 35 and 37 as a result of voltages induced in output windings 33 and 34 of the reference oscillator are applied to the base electrodes or inputs of each bistable multivibrator because of the unidirectional conducting characteristic of diodes 64 and 65. Also, it will be apparent that the voltage spikes applied to the bases of the transistors in phase A multivibrator 10 and the voltage spikes applied to the bases of the transistors in phase B multivibrator 11 are out of phase with each other by 90° of the output frequency of each output phase of the inverter and by 180° of the output frequency of the oscillator. In terms of the voltage spikes shown in FIG. 2D, all and only spikes 42 are fed to the input of multivibrator 10, for example, and all and only spikes 43 are fed to the input of multivibrator 11. The relationship between output phase A and output phase B is represented by the voltage wave shapes depicted in FIGS. 2A and 2B assuming that phase A leads phase B by a 90° phase displacement.

It is equally possible, of course, that phase B lead phase A unless additional phase steering circuits have been provided for sequencing the phases when the inverter is started. It is a particular feature of this invention to provide such a circuit as shown in broken outlines box 70. The phase sequencing circuit consists of a winding 71 on core 59 at phase A multivibrator 10, a diode 72 connected to one end of winding 71, and a differentiating sub-circuit comprising an RC parallel combination consisting of resistor 73 and capacitor 74 and connected in series between diode 72 and emitters 51 and 55 of phase B multivibrator and positive D.C. bus 13. The opposite end of winding 71 is connected to the armature 75 of a SPDT switch. A switch contact 76 is connected to base electrode 53 of phase B transistor 50 and another switch contact 77 is connected to base electrode 57 of phase B transistor 54.

From the description above of bistable multivibrator 10, it will be understood that square wave form alternating voltages are induced in winding 71 linking core 59. These voltages are converted to voltage spikes, both positive and negative corresponding to the positive and negative going wave fronts, by the differentiating sub-circuit connected to it. Only the voltage spikes of one polarity produced by the sequencing circuit, however, are permitted by diode 72 to be applied to the base of the selected switching transistor in phase B multivibrator. The position of switch armature 75 selects one of switching transistors 50 and 54 of phase B multivibrator by connecting the sequencing circuit to its base.

Thus, the phase sequency circuit provides a voltage spike output signal of one polarity to switch armature 75 only and every time multivibrator 10 switches from one particular state to the other; for example, from state I to state II, but not from state II to state I. By positioning of switch armature 75, each of the voltage spikes are applied as a trigger signal to the base of one of the transistors of phase B multivibrator. As shown in FIG. 1, the pulse will turn off or assure the non-conducting condition of the transistor to which it is applied and, thus, the phase sequence is assured.

Once the inverter and its two phases are started in a sequence determined by the position of switch armature 75 and the sequencing circuit, the inverter will continue to be operated in the phase sequence in which it was started by the output spikes produced by the reference oscillator 12. The switch armature 75 may be left in contact with the selected switch contact 76 or 77 during operation of the inverter without interfering with its operation and only insuring the desired phase sequencing. The triggering pulses derived from winding 71 and applied to the base of the selected transistor in multivibrator 11 does not affect its switching once the selected phase sequencing is established as the trigger signal always tends to hold the transistor in its previously triggered state and not to switch it to the opposite state. If one particular phase sequencing is always desired, the phase sequencing circuit may be permanently wired into the appropriate transistor base and the selector switch shown eliminated.

While FIG. 1 shows a static inverter system consisting in part of a well-known type of saturable magnetic oscillator and also shows a common source of D.C. power supplied to the reference oscillator and to both phase A and phase B bistable multivibrators, it will be understood that this invention comprehends using any reference oscillator adapted to provide output pulses of twice the frequency of the desired operating frequency of the static inverter system and the use of separate sources of D.C. power for supplying the two bistable multivibrators and the reference oscillator. With respect to the reference oscillator, it is preferred that the output pulses take the form of voltage spikes when applied to the base inputs of the two multivibrators. In the circuit shown, appropriate input pulses are provided by the combination of the square wave output pulses of the reference oscillator and its associated differentiating networks. It will also be understood that NPN transistrs may be substituted for the PNP transistors shown by giving proper attention to the polarity of the power sources.

Another feature of this invention is its ready adaptability to drive a two-phase induction motor. This can be accomplished easily, simply and directly by employing windings 60 and 62 of both of the output phase multivibrators or power converters as the stator windings of a two-phase induction motor magnetically coupled by stator iron instead of core 59, for example. In effect, the stator windings and stator iron of the induction motor are appropriately combined and arranged with respect to the two pairs of emitter-connected and magnetically coupled switching transistors to form two bistable multivibrators positively interlocked by the reference oscillator trigger signals to provide true two-phase power to the motor under the control of the reference oscillator and in a sequence determined by the novel sequencing and starting network described above. Such a motor and two-phase power supply may be characterized as a brushless D.C. motor. FIG. 3 illustrates such a brushless D.C. motor in which multivibrator 10 and 11 and phase sequencing circuit 70 are connected to the stator windings 60', 62' and 71' of a two-phase induction motor 80. Stator windings 60', 62' and 71' correspond to windings 60, 62 and 71 in FIG. 1.

Those skilled in the art will appreciate that various changes and modifications can be made in the apparatus described herein without departing from the spirit and scope of the invention.

What is claimed is:

1. A two-phase electrical inverter system comprising
a first and a second pair of output terminals,
a source of unidirectional voltage,
a first and a second alternating switching means for connecting said source of unidirectional voltage to said first and said second pair of output terminals respectively, said first and said second switching means having control input terminals, each of said switching means being responsive to trigger pulse signals supplied to its control input terminals to alternately connect by switching at each trigger pulse signal supplied said source of unidirectional voltage to each of the output terminals of its connected pair to provide an alternating output voltage at said connected pair of output terminals,
a signal source providing a succession of trigger pulse signals,
means for supplying alternate ones of the trigger pulse signals to one of said switching means and the remainder of the trigger pulse signals to the other of said switching means,
whereby said first and said second switching means provide at the pairs of output terminals connected to them alternating voltages having a frequency of alternation corresponding to one half the frequency of occurrence of alternate trigger pulse signals and, further, said first and said second switching means provide alternating output voltages at said first and said second output terminals having a phase relationship corresponding to the spacing between said successive trigger pulse signals, sequencing means for providing a predetermined sequence of output voltages of one polarity at said first and said second pairs of output terminals, said sequencing means comprising sensing means for sensing the alternating changes in polarity of output voltage provided at said output terminals of one of said alternating switching means, selecting means connected to said sensing means for selecting only and all of the voltage changes of one polarity sensed by said sensing means and providing trigger pulse output signals corresponding thereto, signal supplying means connecting said selecting means and one of said control input terminals of the other of said alternating switching means for supplying trigger pulse output signals from said selecting means to said one of said control input terminals to insure said other of said alternating switching means is switched to connect said source of unidirectional voltage to a particular one of said connected pairs in response to a particular switched connection of said one of said alternating switching means, and thereby to fix the sequence of output voltages of one polarity provided at said first and said second pairs of output terminals of said alternating switching means.

2. A brushless direct current motor comprising the static inverter apparatus of claim 1 and a two-phase induction motor having a first and a second phase winding connected to said first and said second pair of output terminals respectively of said static inverter apparatus.

3. The brushless direct current motor apparatus of claim 2 in which
said sensing means comprises a sensing winding inductively associated with one of said phase windings of said induction motor, and in which
said selecting means comprises unidirectional conducting means connecting said sensing winding and said signal supplying means associated with the other of said phase windings.

4. The static inverter apparatus of claim 1 in which
said first and second alternating switching means each has an output transformer and said pairs of output terminals each comprise connections to an output winding of said transformer, and in which
said sensing means comprises a sensing winding inductively associated with the output winding of said one of said alternating switching means, and in which,
said selecting means comprises unidirectional conducting means connecting said sensing winding and said signal supplying means.

5. The static inverter apparatus of claim 4 in which
said first and said second alternating switching means each comprises a bistable multivibrator having a pair of switches alternately rendered conducting by the trigger pulse signals to provide an alternating square wave output to its respective pair of output terminals, and in which
said signal source comprises
    an oscillator of predetermined frequency providing a square wave alternating output of twice the desired output frequency of said inverter,
    differentiating means for providing trigger pulse signals from said square output waves, and
    first unidirectional conducting means connected between said signal source and said control input terminals of said first alternating switching means to permit the passage thereto of only alternate trigger pulse signals and
    second unidirectional conducting means connected between said signal source and said control input terminal of said second alternating switching means to permit the passage thereto of only the remainder of the trigger pulse signals.

6. The static inverter apparatus of claim 3 in which
said first and said second alternating switching means each comprises a bistable multivibrator having a pair of switches alternately rendered conducting by the trigger pulse signals to provide an alternating square wave output to its respective pair of output terminals, and in which
said signal source comprises
    an oscillator of predetermined frequency providing a square wave alternating output of twice the desired output frequency of said inverter,
    differentiating means for providing trigger pulse signals from said square output waves, and
    first unidirectional conducting means connected between said signal source and said control input terminals of said first alternating switching means to permit the passage thereto of only alternate trigger pulse signals and
    second unidirectional conducting means connected between said signal source and said control input terminal of said second alternating switching means to permit the passage thereto of only the remainder of the trigger pulse signals.

7. The apparatus of claim 4 together with switch means for selecting the sequence of output voltages of one polarity at said first and said second pairs of output terminals, said switch means comprising a switch for selectively connecting said signal supplying means to one and the other of said control input terminals of the other of said alternating switching means.

8. The apparatus of claim 3 together with switch means for selecting the sequence of output phase voltages, said switch means comprising a switch for selectively connecting said signal supplying means to one and the other of said control input terminals of the other of said alternating switching means.

References Cited

UNITED STATES PATENTS

| | | | |
|---|---|---|---|
| 3,105,180 | 9/1963 | Burnett | 318—138 |
| 3,197,691 | 7/1965 | Gilbert | 321—18 |
| 3,416,057 | 12/1968 | Froyd et al. | 318—227 |

ORIS L. RADER, Primary Examiner

G. RUBINSON, Assistant Examiner

U.S. Cl. X.R.

318—227, 254; 321—27